(12) United States Patent
Gutknecht (10) Patent No.: US 8,790,066 B2
(45) Date of Patent: Jul. 29, 2014

(54) MULTI-LOBE SEMI-FLOATING JOURNAL BEARING (75) Inventor: Daniel Allen Gutknecht, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 993 days.

(21) Appl. No.: 12/708,439

(22) Filed: Feb. 18, 2010

(65) Prior Publication Data
US 2011/0200422 A1 Aug. 18, 2011

(51) Int. Cl.
F01D 21/00 (2006.01)
F01D 25/16 (2006.01)
F01D 25/18 (2006.01)
F02C 6/12 (2006.01)
F16C 33/10 (2006.01)

(52) U.S. Cl.
USPC .............................................. 415/1; 415/111

(58) Field of Classification Search
USPC .................. 415/1, 110–113, 229, 175, 180; 384/100, 114, 118, 901; 184/6.11, 184/6.16; 417/407; 60/605.3
See application file for complete search history.

(56) References Cited

U.S. PATENT DOCUMENTS

| 3,563,555 | A | 2/1971 | Koons |
| 3,625,523 | A | 12/1971 | Gardner et al. |
| 3,631,834 | A | 1/1972 | Gardner et al. |
| 3,653,350 | A | 4/1972 | Koons et al. |
| 3,680,932 | A * | 8/1972 | Raimondi ...................... 384/291 |
| 3,733,144 | A | 5/1973 | Gardner |
| 3,738,717 | A | 6/1973 | Gardner |
| 3,740,058 | A | 6/1973 | Gardner et al. |
| 3,814,487 | A | 6/1974 | Gardner |
| 3,829,180 | A | 8/1974 | Gardner |
| 3,934,952 | A | 1/1976 | Gardner |
| 4,077,682 | A | 3/1978 | Gardner |
| 4,097,094 | A | 6/1978 | Gardner |
| 4,403,873 | A | 9/1983 | Gardner |
| 4,427,309 | A * | 1/1984 | Blake ............................ 384/286 |
| 4,738,550 | A | 4/1988 | Gardner |
| 5,480,234 | A * | 1/1996 | Chen et al. .................... 384/313 |
| 6,402,385 | B1 * | 6/2002 | Hayakawa et al. ........... 384/114 |

(Continued)

FOREIGN PATENT DOCUMENTS

EP 0 083 987 B1 7/1983

OTHER PUBLICATIONS

Mobil Plain Bearings Fluid—Film Lubrication 2005 (?) (2 pages).

(Continued)

Primary Examiner — Edward Look
Assistant Examiner — Jesse Prager
(74) Attorney, Agent, or Firm — Brian J. Pangrle (57) ABSTRACT An exemplary turbocharger assembly includes a housing with a through bore having a central axis extending between a compressor end and a turbine end of the housing and a bearing, configured for receipt by the through bore, where the bearing includes an inner journal configured to rotatably support a turbocharger shaft and where the inner journal includes a central axis, an axial length, a lubricant opening, an axially confined lubricant well, a lubricant ramp, and a lubricant channel that spans the axial length of the inner journal. Various other exemplary devices, systems, methods, etc., are also disclosed.

14 Claims, 8 Drawing Sheets

(56) References Cited

U.S. PATENT DOCUMENTS

| | | | |
|---|---|---|---|
| 6,481,978 B2 * | 11/2002 | Zamalis et al. | 417/228 |
| 6,709,160 B1 * | 3/2004 | Ward et al. | 384/286 |
| 8,328,506 B2 * | 12/2012 | Furman et al. | 415/173.3 |
| 2007/0003175 A1 * | 1/2007 | Petitjean et al. | 384/322 |
| 2008/0098735 A1 * | 5/2008 | Gutknecht | 60/605.3 |
| 2008/0232729 A1 | 9/2008 | Petitjean et al. | |
| 2009/0074337 A1 * | 3/2009 | Kashchenevsky | 384/111 |

OTHER PUBLICATIONS

Chen, W.J., Rotordynamic Characteristics of Large Locomotive Turbochargers, Proceedings of the 8th IFToMM International Conference on Rotordynamics, Sep. 12-15, 2010, KIST Seoul, Korea (8 pages).

Waukesha, Sleeve Type Journal Bearings, Catalog W1-A 2005 (?) (1 pages).

Waukesha Bearings: we engineer customer success 2005 (?) (2 pages).

* cited by examiner

MULTI-LOBE SEMI-FLOATING JOURNAL BEARING

TECHNICAL FIELD

Subject matter disclosed herein relates generally to turbomachinery for internal combustion engines and, in particular, to bearing systems.

BACKGROUND

A conventional turbocharger typically relies on a center housing rotating assembly (CHRA) that includes a turbine wheel and a compressor wheel attached to a shaft rotatably supported in a center housing by one or more bearings. During operation, and directly after operation, heat energy from various sources can cause components to reach temperatures in excess of 1000 degrees Fahrenheit (538 degrees Celsius). Sources of heat energy include viscous shearing of lubricant films (e.g., lubricant between a rotating shaft and a bearing surface), viscous heating of inlet gas, exhaust heat, frictional heating, etc. Factors such as mass of the rotating components, lubricant properties, rotational speeds, etc., can affect heat generation.

High temperatures can cause carbonization of carbonaceous lubricants (e.g., oil), also known as coke formation or "coking". Coking can exasperate heat generation and heat retention by any of a variety of mechanisms and, over time, coke deposits can shorten the lifetime of a lubricated bearing system. For example, coke deposits can reduce bearing system clearances to a point where seizure occurs (e.g., between a bearing and a shaft), which results in total failure of the bearing system and turbocharger. Such phenomenon should be considered during development of turbochargers that operate at high rotational speeds or in high temperature environments and turbochargers with high mass rotating components. For example, use of high strength materials like titanium (e.g., titanium compressor wheels) for rotating components can increase mass of a rotating assembly and thus heat generation.

Various approaches exist to enhance lubricant flow in a bearing system. Enhanced lubricant flow can reduce heat retention (e.g., temperature maxima or temperature/time profiles) and, in turn, reduce coking. For example, a series of intricate journal surface features may be machined into a bearing to enhance lubricant flow adjacent a turbocharger shaft. While such an approach may be beneficial, it must be balanced against the costs of machining the intricate journal surface features.

Various exemplary techniques described herein can provide journal bearing surfaces to provide enhanced lubricant flow (e.g., to reduce coking). Various exemplary techniques can provide such features using machining techniques that effectively balance benefits and costs.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings where.

DETAILED DESCRIPTION

Figure 1:
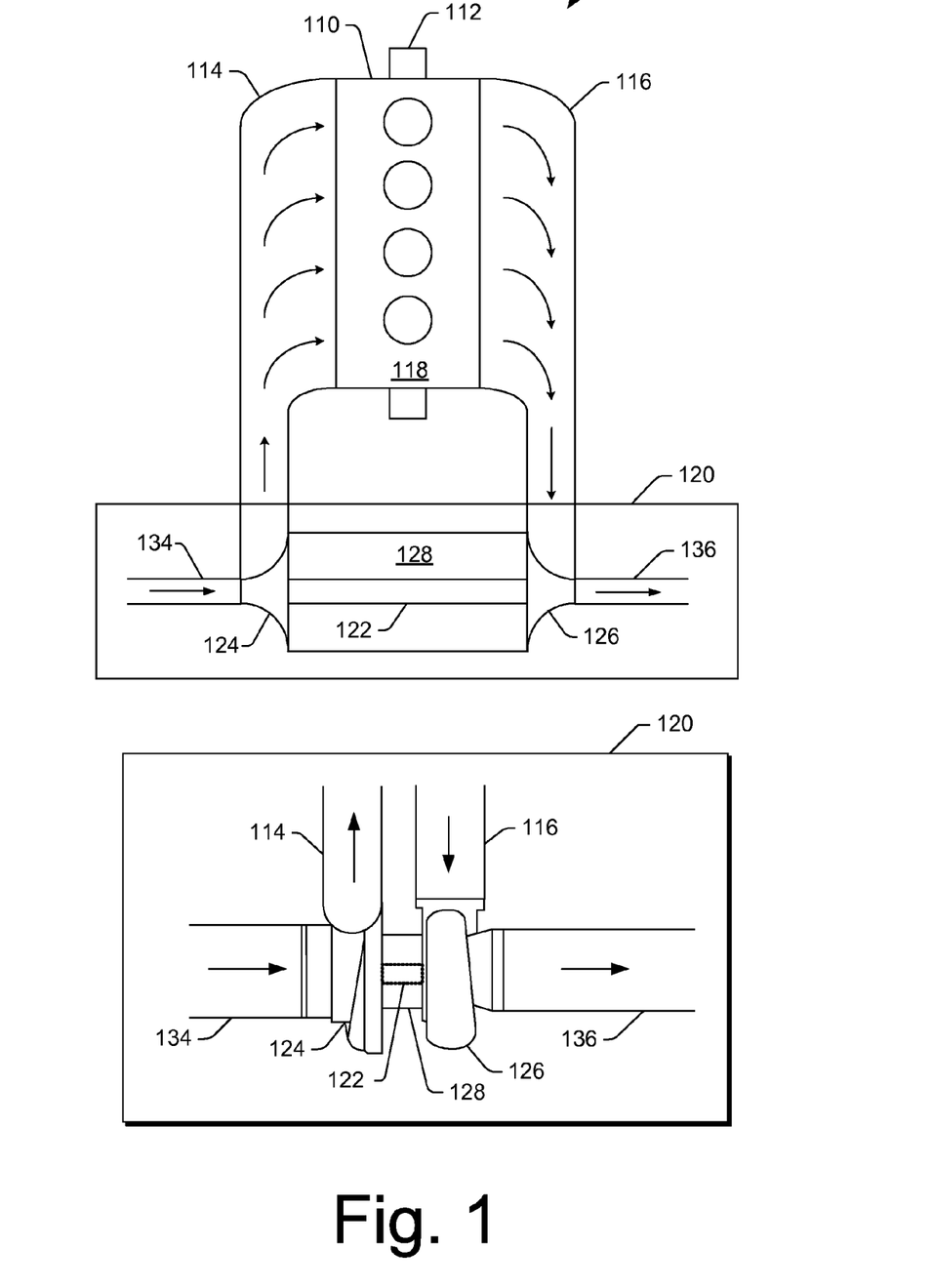
FIG. 1 is a diagram of a turbocharger and an internal combustion engine.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components.

Referring to the turbine 126, such a turbine optionally includes a variable geometry unit and a variable geometry controller. The variable geometry unit and variable geometry controller optionally include features such as those associated with commercially available variable geometry turbochargers (VGTs). Commercially available VGTs include, for example, the GARRETT® VNT™ and AVNT™ turbochargers, which use multiple adjustable vanes to control the flow of exhaust across a turbine. An exemplary turbocharger may employ wastegate technology as an alternative or in addition to variable geometry technology.

Figure 2:
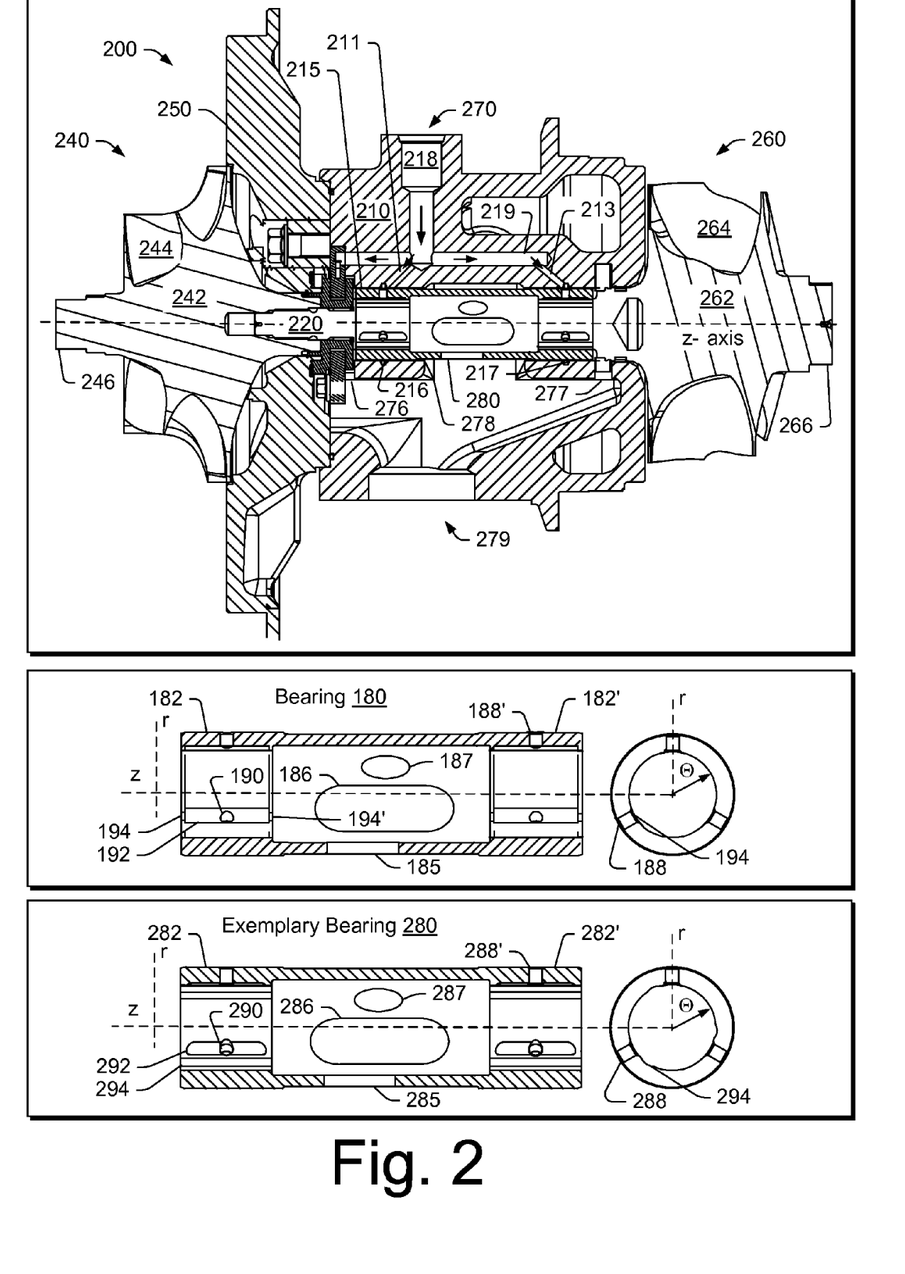
FIG. 2 is a series of cross-sectional views of a center housing rotating assembly, a bearing and an exemplary bearing.

FIG. 2 shows several cross-sections of an exemplary turbocharger assembly 200 suitable for use in the turbocharger 120 of FIG. 1. The cross-sections include a cross-section of a center housing rotating assembly, a cross-section of a bearing 180 and a cross-section of an exemplary bearing 280. In a cylindrical coordinate system, bearing features may be defined with respect to radial, azimuthal (angular) and axial coordinates (e.g., r, Θ, z, respectively). See, e.g., Beyer, W. H., *CRC Standard Mathematical Tables,* 28th ed. Boca Raton, Fla. CRC Press, p. 212, 1987.

The assembly 200 serves as a non-limiting example to describe various exemplary devices, methods, systems, etc., disclosed herein. The turbocharger 200 includes a center housing 210, a shaft 220 (not shown in bearing section to highlight features of the bearing 280), a compressor wheel 240 and a turbine wheel 260 where the compressor wheel 240 and the turbine wheel 260 are operably connected to the shaft 220.

The shaft 220 may be made of multiple components that form a single operable shaft unit or it may be a unitary shaft. The compressor wheel 240, the turbine wheel 260 and the shaft 220 have an axis of rotation substantially coincident with the z-axis. The center housing 210 supports a bearing 280 that receives the shaft 220 and allows for rotation of the shaft 220 about the z-axis.

The compressor wheel 240 includes a hub 242 and a plurality of blades 244. The hub 242 terminates at a nose end 246, which may be shaped to facilitate attachment of the compressor wheel 240 to the shaft 220. The turbine wheel 260 includes a hub 262 and a plurality of blades 264. The hub 262 terminates at a nose end 266, which may be shaped to facilitate attachment of the turbine wheel 260 to the shaft 220.

The shaft 220 includes a compressor shaft portion that extends into a bore of the compressor wheel hub 242. While the example of FIG. 2 shows a "boreless" compressor wheel (i.e., no through bore), other types of compressor wheels may be used. For example, a compressor wheel with a through bore or full bore typically receives a shaft that accepts a nut or other attachment mechanism at the nose end 246 of the hub 242. Such an attachment mechanism may include features to accept a socket or a wrench (e.g., consider a hexagonal shape).

In general, a bore is a cylindrical hole having a diameter (or radius) as well as a length along an axis. For example, a bore may be manufactured using a drill with an appropriate drill bit where the drill and drill bit may be selected based on the type of material to be drilled. For example, where the compressor wheel 260 is made of aluminum, a manufacturing process will specify a drill and drill bit as well as drill rotational speed and axial motion for drilling a bore in aluminum. Drilling may occur prior to, during and/or after assembly of a center housing rotating assembly. Access to one or more surfaces for drilling may vary depending on the stage of assembly.

In FIG. 2, the center housing 210 includes a through bore 215 (for receipt of the bearing cartridge 280), a lubricant inlet bore 218 for forming a lubricant inlet 270 and a transverse lubricant bore 219 for forming a lubricant distribution path to a bore 211 that extends to compressor side opening of the through bore 215 and to a bore 213 that extends to a turbine side opening of the through bore 215. In the example of FIG. 2, the bores 211, 213 extend to respective grooves in the through bore 215, which may be less than a full circle (i.e., less than 360 degrees) about the axis of the bore 215. As shown in FIG. 2, the through bore 215 may vary in diameter or radius, for example, the through bore 215 steps to a larger radius that defines a mid-section (e.g., a mid-section well) disposed between its turbine end and compressor end.

The lubricant inlet bore 218 and the transverse lubricant bore 219 are formed by drilling the center housing 210 from respective outer surfaces (e.g., a top surface and a frontal or compressor side surface). The transverse lubricant bore 219 also supplies lubricant to the compressor side thrust collar. The bearing lubricant grooves of the through bore 215 may be formed by drilling the center housing 210 via a turbine end and/or the compressor end of the center housing 210.

The housing 210 further includes intermediate lubricant outlets 276, 277 and 278 and a lubricant outlet 279. In general, lubricant flows through the center housing 210 under pressure, which may be partially facilitated by gravity (e.g., lubricant inlet 270 and lubricant outlet 279 may be substantially aligned with gravity) where upon shut down, gravity causes at least some draining of lubricant from the center housing 210.

In the arrangement of FIG. 2, during operation, lubricant flows to the bearing 280 and forms various films. The close-up cross-sectional view of the bearing 280 shows a compressor side outer surface 282 and a turbine side outer surface 282' that form films with the surface of the through bore 215. These films allow the bearing 280 to "float" in the through bore 215. To lubricate the shaft 220, lubricant enters the bearing 280 via a compressor side opening 288 (see end view) and a turbine side opening 288' (see cross-sectional view). Lubricant is distributed to respective shaft journal surfaces via at least the openings 288, 288'.

Additional features for lubricant distribution in the bearing 280 are shown with respect to the compressor side cross-sectional view and a compressor side end view. As shown in these views, the outer opening 288 (end view) leads to an inner opening 290 of a well 292 (cross-sectional view). In the example of FIG. 2, the well 292 does not extend to the compressor end of the bearing 280 or to a center section end of the compressor side journal surface; in other words, the well 292 is confined axially. Such an arrangement allows lubricant to form and flow primarily to a lubricant film disposed between the compressor side journal surface and the shaft 220. In the exemplary bearing 280, lubricant can exit the lubricant film via another feature, which is shown as a channel 294 that extends to at least one axial end of the journal surface (i.e., the channel 294 is not confined axially). In the example of FIG. 2, the channel 294 extends to both axial ends of the compressor side journal surface (see, e.g., the end view of the bearing 280). As shown, a center section can receive lubricant from the channel 294, which may exit the bearing 280 via one or more openings (see, e.g., openings 285, 286 and 287).

As described herein, various features of the exemplary bearing 280 may be formed by turning and drilling a bearing blank, machining one or more channels (optionally during the drilling operation or a blanking operation) and broaching one or more features with a "broacher" (e.g., a broaching machine). Broachable features may include one or more inside diameter features, one or more ramp features, one or more channel features, etc. The exemplary bearing 280 includes various internal features, formed via broaching, which provide for lubricant flow functions of a multi-lobed bearing.

In FIG. 2, the bearing 180 represents a type of multi-lobed bearing that does not include features formed by broaching and that includes features formed by high precision machining. The close-up cross-sectional view of the bearing 180 shows a compressor side outer surface 182 and a turbine side outer surface 182' that can form films with the surface of the through bore 215. These films can allow the bearing 180 to "float" in the through bore 215. To lubricate the shaft 220, lubricant can enter the bearing 180 via a compressor side opening 188 (see end view) and a turbine side opening 188' (see cross-sectional view). Lubricant can be distributed to respective shaft journal surfaces via the openings 188, 188'. Additional features for lubricant distribution in the bearing 180 are shown with respect to the compressor side cross-sectional view and the compressor side end view. As shown in these views, the outer opening 188 (end view) leads to an inner opening 190 (cross-sectional view) of a well 192 that extends to the compressor end of the bearing 180 (see feature 194, which provides for an axial exit) and to a center section end of the compressor side journal surface; in other words, the well 192 is not confined axially. Such an arrangement allows lubricant to flow to a lubricant film disposed between the compressor side journal surface and the shaft 220 and at least some lubricant to exit axially with minimal contribution to the lubricant film. As shown, a center section can receive lubricant from the well 192 via a feature 194', which may then exit the bearing 180 via one or more openings of the center section (see, e.g., openings 185, 186 and 187). Features of the bearing 180 may be formed by turning and drilling a bearing blank, high precision machining of channel and spillway features, very high precision machining of ramp features where channel and spillway features are intricate and difficult to inspect with an unaided eye and where a small variation in size of a feature can result in a large variation in lubricant flow.

As mentioned in the Background section, coke formation can cause failure or shorten the life of a bearing system. Chemical reactions responsible for coke formation depend on temperature and time. For example, lubricant that reaches a high temperature for a short time may form coke and lubricant that reaches a lesser temperature for a longer time may form coke. As described herein, an exemplary bearing includes lubricant flow paths defined by various features that help reduce local temperature maxima of lubricant and/or help reduce residence time of lubricant adjacent a rotating shaft. As described below, an exemplary bearing can include features that support lubricant film flow and pressure characteristics that act to reduce coking. Further, various features of an exemplary bearing may be formed by broaching, which is a process that can enhance overall cost/benefit of an exemplary bearing when compared to a bearing that relies solely on high precision machining to form lubricant flow related features.

Referring again to the well 192, as it is not confined axially, a change in the feature 194 is likely to have a significant impact on how lubricant flows. Specifically, a change that enlarges the feature 194 is likely to increase flow of lubricant axially where such lubricant exits the bearing without providing any significant support to the compressor side lubricant film. In contrast, as the well 292 is confined axially, a change in its size or shape is unlikely to have a significant impact on lubricant flow (e.g., relative to a change in the end feature 194). For example, a small increase in an axial dimension will merely increase the volume of the well 292 without any significant risk of diverting lubricant away from the lubricant film.

As described herein, various exemplary bearings may be used in turbochargers that include a titanium compressor wheel and/or a heavy rotor. Such turbochargers are known to require so-called "high capacity" bearings to support the rotor mass and provide stable operation. Such turbochargers tend to have bearing systems that run much hotter as a result of their high load capacity. High shaft temperatures can cause coking of lubricant where coke buildup on the shaft and the bearings can lead to a loss of bearing internal clearances which ultimately leads to failure of the bearing system.

Various exemplary bearings are shown as floating bearings. While semi-floating bearing systems have been used to address high loads, semi-floating bearings tend to require quite high lubricant flow rates and are generally quite expensive (e.g., may increase bearing system cost by a factor exceeding 10:1). Further, semi-floating bearing systems tend to exhibit high shaft motion for a turbocharger mounted on an internal combustion engine (i.e., a high vibration environment).

As described herein, various exemplary journal bearings include a plurality of axially confined wells. Additionally, when implemented in a fully floating bearing system, an outer film forms with high stiffness and good damping characteristics, which helps to insure bearing stability in high vibration environments. While various characteristics associated with semi-floating bearings may be disadvantageous, an exemplary semi-floating bearing may include a plurality of axially confined wells.

A bearing in a rotating assembly can be viewed as having a loaded side and an unloaded side (i.e., a unidirectional radial force vector). As described herein, axially confined wells can provide suitable lubricant flow to both loaded and unloaded sides of an exemplary bearing. Lubricant flow through an unloaded side of a bearing cools the bearing and the shaft. Such cooling acts to reduce local temperature maxima that can cause coking.

As described herein, an axially confined well spans an angle (or angles) about a bearing axis, which substantially defines a well width (or widths), where an angle may be defined as an arc span at an axial position. An axially confined well also spans an axial distance along an inner journal surface of an exemplary bearing. Further, an axially confined well includes a radial depth, which may be substantially constant or vary over the well. The dimensions of the well define a well volume, which may be a parameter tailored for performance (e.g., depending on shaft mass, shaft speed, lubricant properties, operational temperatures, etc.).

As described herein, a combination of axially confined wells and one or more other features can ensure that lubricant can enter between a shaft and bearing efficiently to allow generation of a pressure wedge that supports loads being imparted to the bearing from the shaft. An exemplary bearing may include one or more ramped surfaces (e.g., as used in thrust bearings). A turbocharger may include an external high pressure lubricant supply to overcome pressures in a bearing to thereby ensure that an exemplary bearings experiences adequate lubricant flow to support the shaft and carry away heat.

As described herein, an exemplary assembly keeps a shaft and its bearing cooler. Further, cooler lubricant typically has higher viscosity which is more effective at separating surfaces.

As described herein, an exemplary bearing may replace a conventional fully floating bearing. To limit or prevent rotation of a bearing in a bore of a housing, an exemplary assembly may use an anti-rotation pin or other anti-rotation mechanism to prevent rotation of the bearing.

Figure 3:
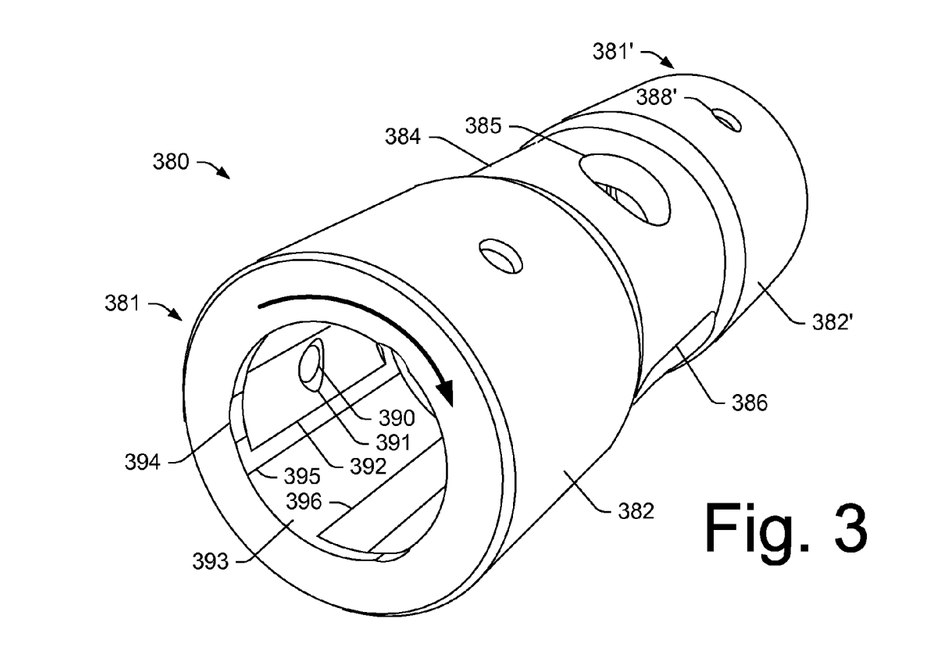
FIG. 3 is a perspective view of a bearing.
Figure 4:
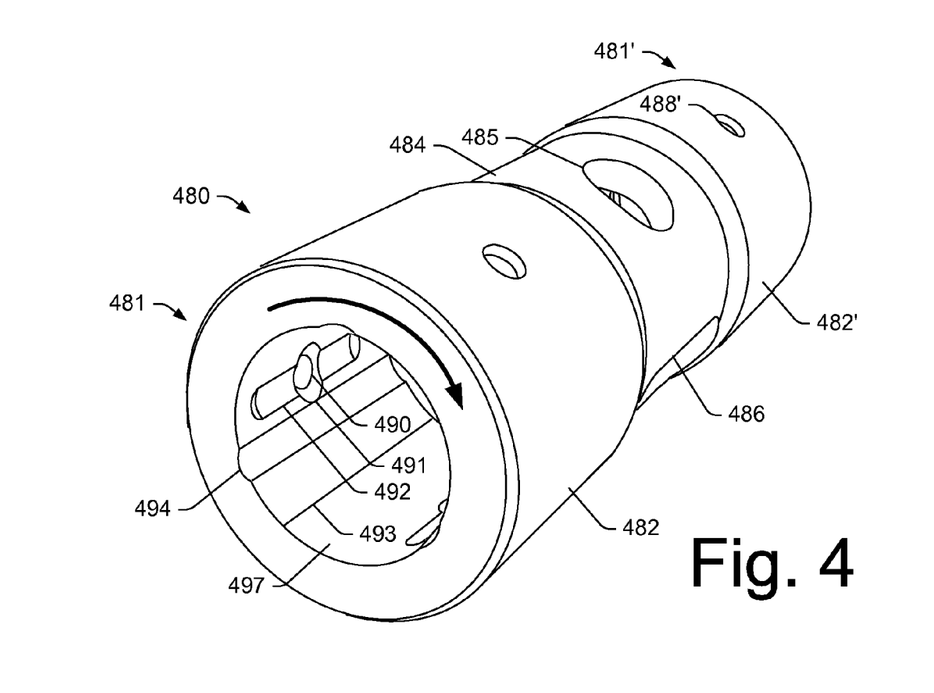
FIG. 4 is a perspective view of an exemplary bearing.

FIG. 3 shows a perspective view of a bearing 380 and FIG. 4 shows a perspective view of an exemplary bearing 480 where arrows indicate a clockwise direction of rotation for a shaft positioned in an axial through bore of the bearing 380 or the exemplary bearing 480. The bearing 380 includes a compressor end 381 and an opposing turbine end 381'. An outer surface 382 allows for formation of an outer lubricant film on a compressor side of a through bore of a center housing while an outer surface 382' allow for formation of an outer lubricant film on a turbine side of a through bore of a center housing. A center section 384 is disposed at a radius that is less than that of the outer surfaces 382, 382'. The center section 384 includes openings 385 and 386, which may differ in size, shape, etc. As to lubricant flow to the bore of a center housing, consider an arrangement such as that of the assembly 200 of FIG. 2, for example, where housing lubricant bores 211 and 213 lead to respective circular grooves 216 and 217, which can provide lubricant to a bearing. In this example, the circular grooves 216 and 217 may be full circular grooves to ensure that lubricant can flow to one or more radial bores regardless of the rotational position of the bearing in the bore of the center housing.

With respect to lubricant flow to the compressor side journal surface, an opening of the outer surface 382 of the bearing 380 (not shown in perspective view) allows for lubricant flow (e.g., via a radial bore) to a corresponding journal surface opening 390. The opening 390 has a chamfered edge 391 with an enlarged diameter that joins a surface of a well 392. In the example of FIG. 3, the well 392 is not axially confined as an end feature 394 allows lubricant to flow axially outward from the well 392 to exit the bearing 380. The bearing 390 also includes additional feature 393, which is a journal surface, and features 395 and 396, which are associated with ramps (e.g., varying radial depths). The features 392, 394 and 395 are typically formed using high precision machining; whereas, other features, such as 393 and 396, are typically formed using very high precision machining. Waukesha Bearings (Pewaukee, Wis.) markets some bearings with features formed at least in part by high precision machining.

Referring to FIG. 4, the exemplary bearing 480 includes a compressor end 481 and an opposing turbine end 481'. An outer surface 482 allows for formation of an outer lubricant film on a compressor side of a through bore of a center housing while an outer surface 482' allow for formation of an outer lubricant film on a turbine side of a through bore of a center housing. A center section 484 is disposed at a radius that is less than that of the outer surfaces 482, 482'. The center section 484 includes openings 485 and 486, which may differ in size, shape, etc. As to lubricant flow to the bore of a center housing, consider an arrangement such as that of the assembly 200 of FIG. 2 (see, e.g., housing lubricant bores 211 and 213 and circular grooves 216 and 217).

With respect to lubricant flow to the compressor side journal surface, an opening (see opening 488 of cross-sectional view of FIG. 5) on the outer surface 482 of the bearing 480 allows for lubricant flow (e.g., via a radial bore) to a corresponding journal surface opening 490. The opening 490 has a chamfered edge 491 with an enlarged diameter that joins surfaces of a well 492. In the example of FIG. 4, the edge 491 has an arc span that exceeds that of the well 492. Further, the edge 491 may be optionally machined in a manner such that it extends to an edge of a channel 494; noting that the well 492 does not otherwise connect to the channel 494. In the example of FIG. 4, the well 492 is confined axially. Specifically, the axial span of the well 492 is less than the axial span of the compressor side journal surface and the well 492 does not extend to either end of the compressor side journal surface. In the example of FIG. 4, the bearing 480 includes various other features, such as, a journal surface 493 and a ramped surface 497. As described herein, the features 493, 494 and 497 may be formed via broaching (e.g., using a broach and a broaching machine or "broacher"). The well 492 may be formed using a precision machining process, for example, where the required precision may be less than that of the high and very high precision machining typically used to form the features 392, 393, 394, 395 and 396 of the bearing 380 of FIG. 3.

As described herein, an exemplary bearing may be implemented in a turbocharger assembly configured to use a sleeve type journal bearing, for example, to support heavier rotors running at higher speeds. As mentioned, heavy rotor and high speed systems run at much higher temperatures, which can degrade conventional mineral oil lubricants and result in localized oil coking in the bearing system. Build-up of coked oil restricts oil flow and can eventually result in failure of a bearing system. To overcome such issues, sleeve bearings such as the bearing 180 and the bearing 380 have been implemented in some large turbochargers. As mentioned, such bearings can have complicated internal geometries that require use of high precisions (or very high precision) machining processes. Consequently, such features (e.g., geometries) can be difficult to produce and result in high bearing cost.

The exemplary multi-lobe bearings 280 and 480 of FIGS. 2 and 4 can include one or more ramp features where geometry may be uniform from end to end of the bearing, which, in turn, permits such ramp features to be made by broaching or extrusion processes. As discussed with respect to the bearings 280 and 480, axial lubricant flow may be controlled by placement of simple groove (channel) geometries on the bearing inner surface that can be made using standard precision machining processes.

In general, a broaching machine is a tool for finishing surfaces by drawing or pushing a cutter called a broach over and past a surface. A typical broach includes a series of cutting teeth arranged in a row or rows, for example, graduated in height from the teeth that cut first to those that cut last. In such an example, the total depth of cut is distributed over all the teeth where each tooth removes only a fraction of the total cut depth (e.g., a few thousandths of an inch). As described herein, broaching is particularly suitable for internal surfaces such as holes and channels (or grooves). Broaching machines are usually hydraulically operated.

Figure 5:
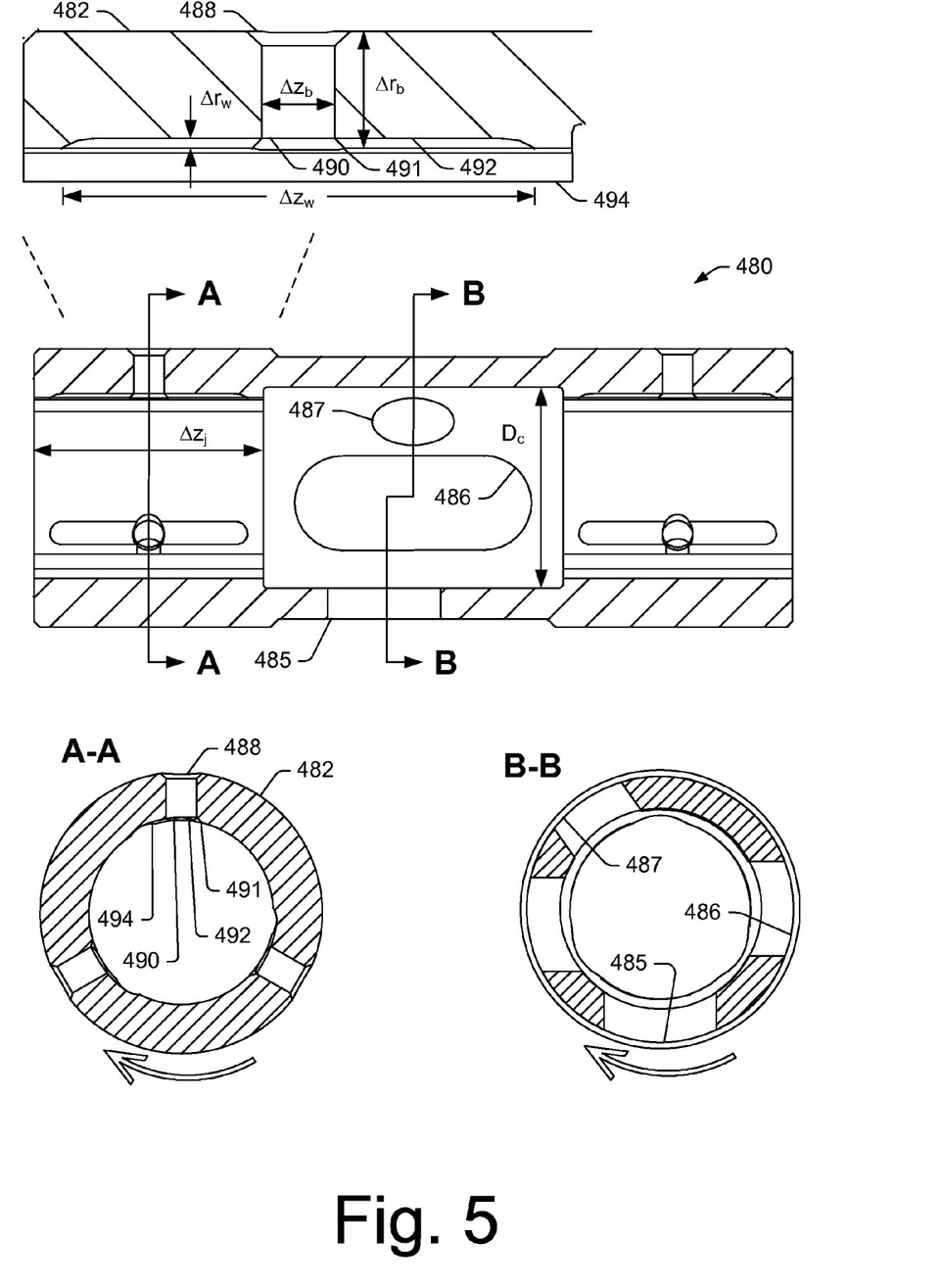
FIG. 5 is a series of cross-sectional views of the exemplary bearing of FIG. 4.

FIG. 5 shows various cross-sectional views of the exemplary bearing 480 of FIG. 4. A close-up view of the bearing 480 shows the outer surface 482, the outer opening 488, the inner opening 490, the enlarged perimeter 491 extending from the opening 490, the well 492 and the channel 494. Various dimensions are also shown, including a radial dimension of the well 492 ($\Delta r_w$), an axial dimension of the well 492 ($\Delta z_w$), a radial dimension of a bore extending from the perimeter 491 to the opening 488 ($\Delta r_b$) and an axial dimension of the bore ($\Delta z_b$). In a full cross-sectional view, various openings are shown in a diameter ($D_c$) of a center section of the bearing 480, including openings 485, 486 and 487. Further, an axial dimension of an inner journal surface is also shown ($\Delta z_j$) (i.e., journal surface for cooperation with a shaft).

In a cross-sectional view along a line A-A, the outer opening 488, the inner opening 490, the perimeter 491, the well 492 and the channel 494 are shown. In a cross-sectional view along a line B-B, the openings 485, 486 and 487 are shown. Further, arrows indicate a clockwise direction of rotation for a shaft positioned in an axial through bore of the bearing 480. As described herein, various features are positioned, to enhance lubrication, based on the direction of shaft rotation.

Figure 6:
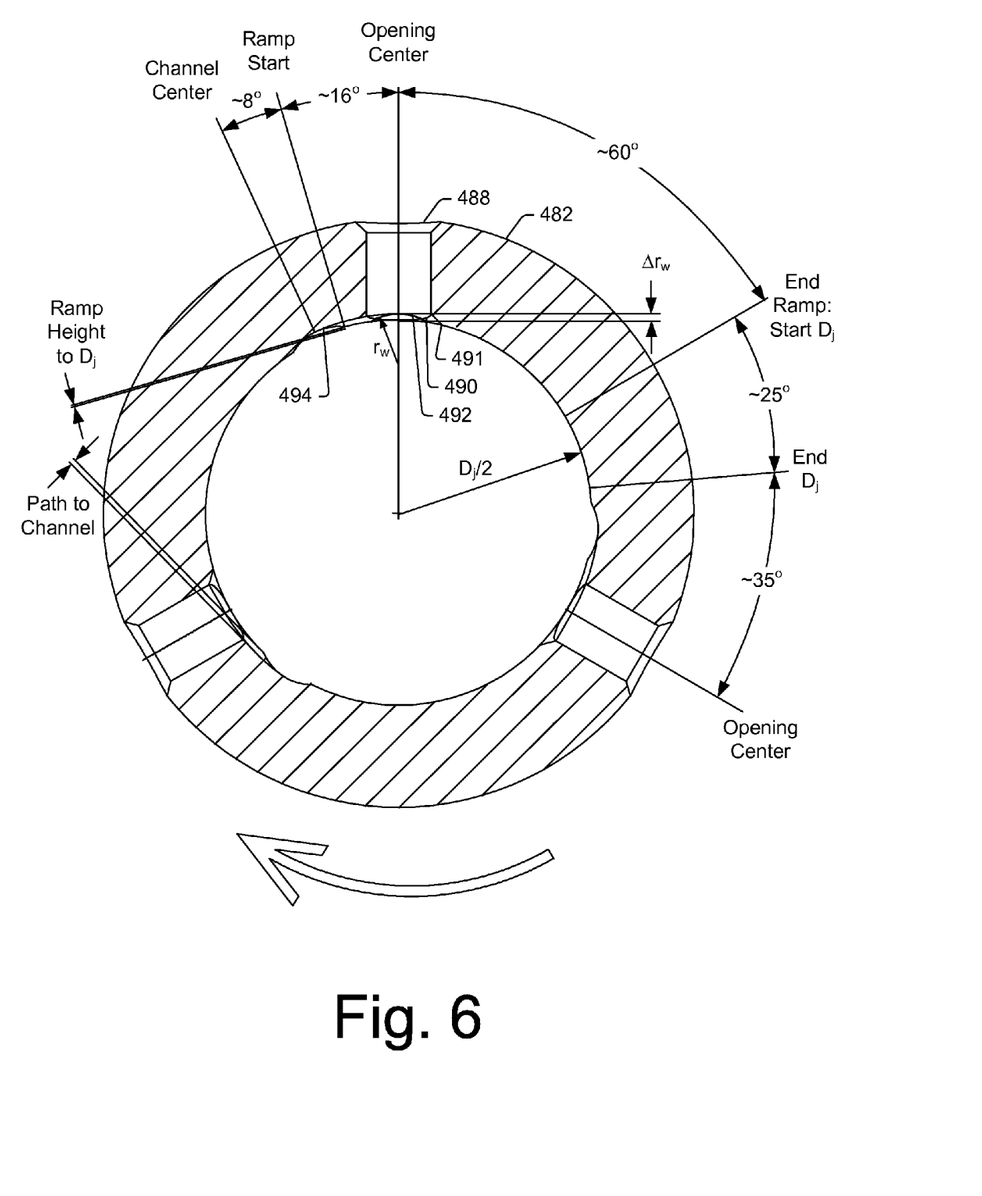
FIG. 6 is a cross-sectional view of the exemplary bearing of FIGS. 4 and 5.

FIG. 6 shows an enlarged view of the cross-section along the line A-A of the exemplary bearing 480 of FIGS. 4 and 5. As shown, the exemplary bearing 480 includes various features that extend azimuthally over the inner surface. The features include a ramp that has a start point (e.g., about 16 degrees counter-clockwise the center axis of the opening 488) and an end point (e.g., about 60 degrees clockwise from the center axis of the opening 488). In the example of FIG. 6, the ramp spans an arc angle of about 76 degrees where the ramp commences at or near a channel, spans a well and terminates prior to another channel. With respect to forming the ramp, a tool may be inserted into the central bore of a bearing and offset slightly from the center axis of the central bore. In such an example, the radius (or diameter) of the tool may differ from the inner journal surface diameter ($D_j$) (see also the ramp height to $D_j$ dimension).

A tool for forming the inner journal surface diameter ($D_j$) may be inserted prior to a tool for formation of the ramp; noting that a finishing tool may be inserted to finish the inner journal surface diameter ($D_j$) after formation of the ramp. In these examples, the tools may be broaches. In the example of FIG. 6, the inner journal surface diameter ($D_j$) (e.g., a journal pad) has an arc span of about 25 degrees as disposed between an end of a ramp and a channel.

FIG. 6 also shows the radial dimension of the well 492 ($\Delta r_w$), a well radius ($r_w$) and a radial path to channel dimension, which connects the perimeter 491 to the channel 494. In the example of FIG. 6, the channel 494 may have an arc span of about 16 degrees.

With respect to distribution of lubricant in the example of FIG. 6, as lubricant enters the inner journal of the bearing 480, a rotation shaft sweeps the lubricant from the well 492 clockwise along the ramp, to the inner journal surface at diameter $D_j$ and to a channel located near another well. In this example, the channel can receive lubricant from the inner journal surface at diameter Dj (via clockwise flow) and from the opening (via counter-clockwise flow). Such an arrangement can ensure acceptable flow during operation (rotating shaft) and at shut-down (stationary shaft). Specifically, during operation, lubricant flows primarily in a clockwise direction to ensure suitable film formation and cooling while, at shut-down, lubricant can flow in a counter-clockwise direction to a channel to thereby carry heat energy axially away from the bearing 480 and its shaft.

Figure 7:
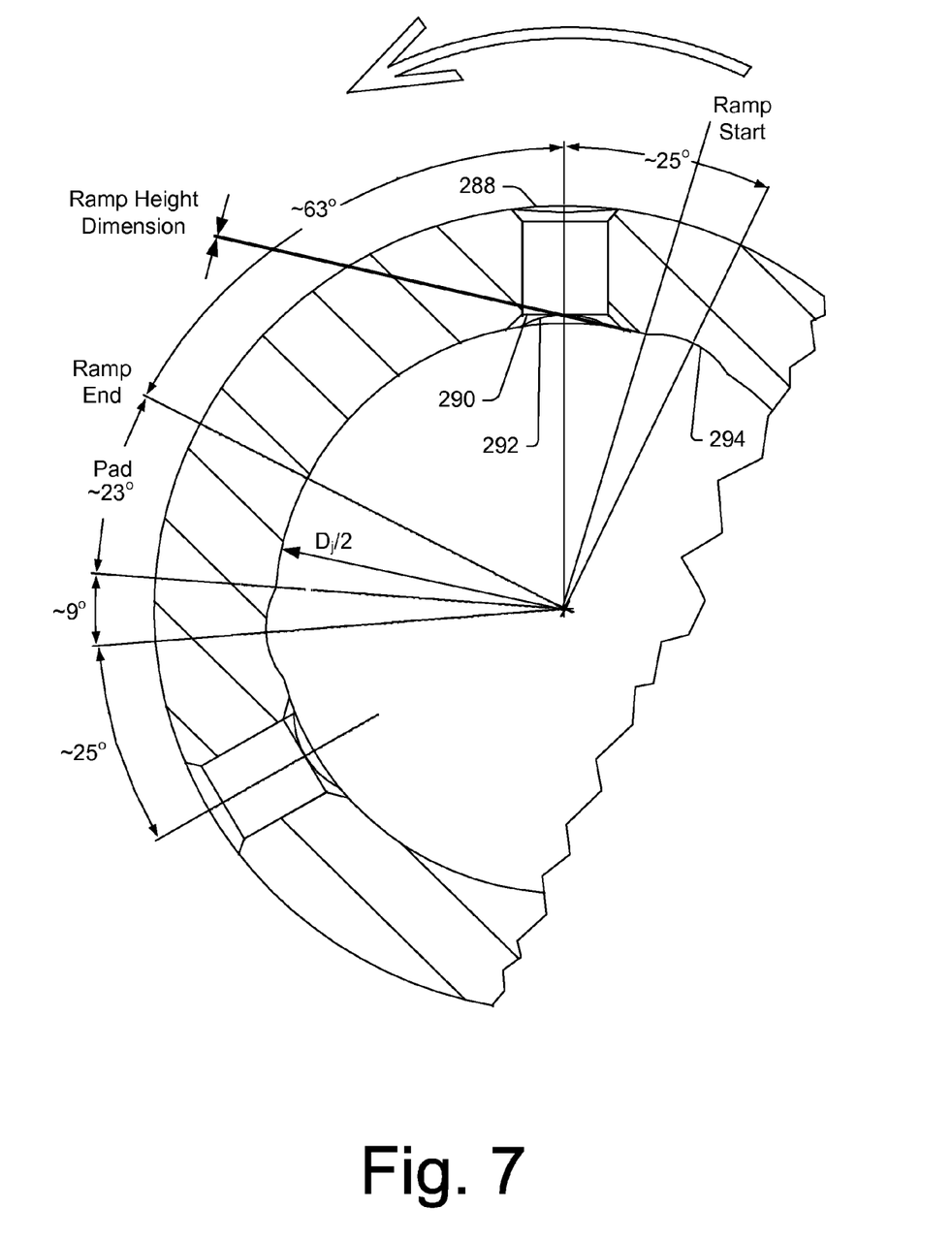
FIG. 7 is a cross-sectional view of the exemplary bearing of FIG. 2.

FIG. 7 shows a cross-section of the exemplary bearing 280 of FIG. 2. In this example, rotation occurs in a counter-clockwise direction. A ramp is shown as extending from a ramp start point adjacent the channel 294 to a ramp end point, with a total arc span of about 88 degrees. An inner journal surface at a diameter $D_j$ forms a pad for supporting a lubricant film between the bearing 280 and a shaft. In the example of FIG. 7, the well 292 does not include the connection as in the examples of FIG. 6, however, the ramp does commence at the channel 294 with a certain ramp height, which may allow for some flow of lubricant to the channel 294.

Figure 8:
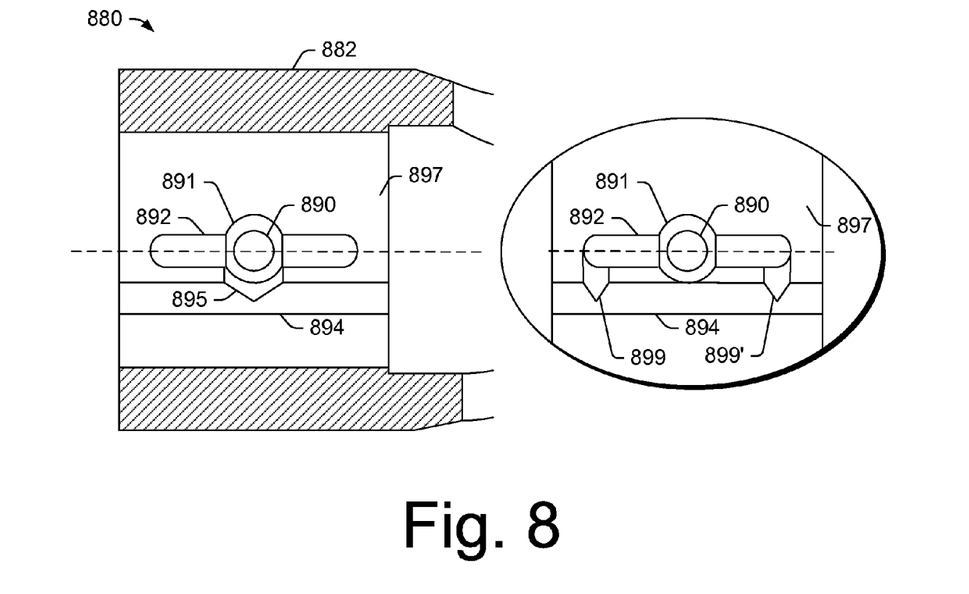
FIG. 8 is a cross-sectional view of an exemplary bearing.

FIG. 8 shows an exemplary bearing 880 where an opening (not shown) on the outer surface 882 allows for lubricant flow to a corresponding opening 890 located at a ramped surface 897. The opening 890 has a chamfered edge 891 with an enlarged diameter that joins surfaces of a well 892. In the example of FIG. 8, the edge 891 has an arc span that exceeds that of the well 892. Further, a feature 895 extends from the edge and connects the edge 891 to an axial channel 894; noting that the well 892 does not otherwise connect to the channel 894. In the example of FIG. 8, the well 892 is confined axially. Specifically, the axial span of the well 892 is less than the axial span of the ramped surface 897 and the well 892 does not extend to either end of the ramped surface 897. In the example of FIG. 8, the size and shape of the feature 895 can be selected for purposes of controlling lubricant flow to the channel 894, which may also impact flow of lubricant to or from the well 892 (e.g., residence time of lubricant in the well 892, pressure of lubricant in the well 892, etc.). The feature 895 has a radial depth (e.g., compared to a neighboring surface), an axial width and an azimuthal angle or arc span that define a flow path.

FIG. 8 also shows an alternative exemplary arrangement of features that includes the axially confined well 892 with features 899, 899' that connect the well to the axial channel 894. Each of the features 899, 899' has a radial depth (e.g., compared to a neighboring surface), an axial width and an azimuthal angle or arc span that define a flow path. As described herein, an exemplary arrangement of features may include the feature 895 and one or more of the features 899, 899'. While each of the features 899, 899' is shown as being aligned with a respective end of the well 892, such a feature could be positioned at any axial position with respect to the well 892. The features 895, 899 or 899' (or similar features) may be shaped, positioned or shaped and positioned to provide for beneficial lubricant flow. For example, the features 899, 899' may increase lubricant flow in a manner beneficial to cooling of a shaft and bearing system.

Figure 9:
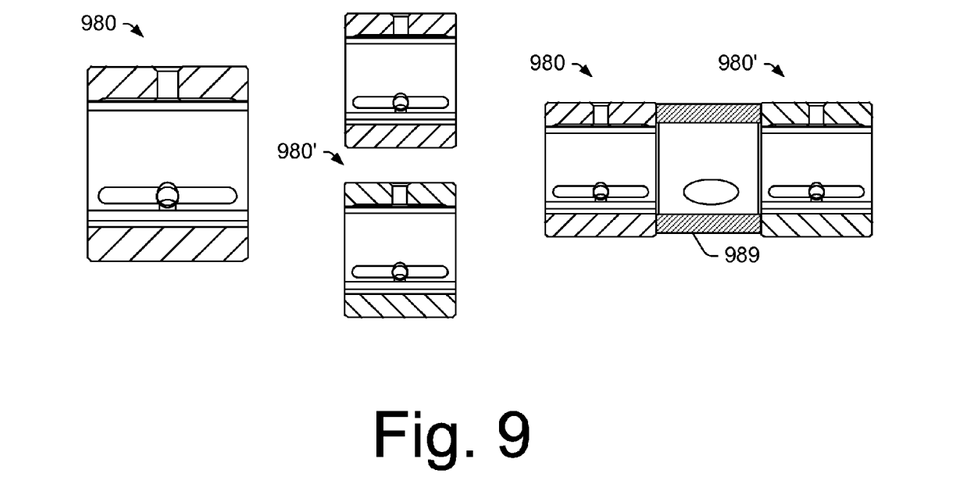
FIG. 9 is a cross-sectional view of two exemplary bearings.

FIG. 9 shows various exemplary bearing arrangements, for example, a rotating assembly may include a single bearing 980 or multiple single bearings 980, 980', which may be separated by a spacer 989. Where an assembly includes multiple single bearings, the single bearings may be identical or specifically tailored (e.g., a compressor-side bearing and a turbine-side bearing).

As described herein, an exemplary turbocharger assembly includes a housing with a through bore having a central axis extending between a compressor end and a turbine end of the housing and a bearing, configured for receipt by the through bore, where the bearing includes an inner journal configured to rotatably support a turbocharger shaft and where the inner journal includes a central axis, an axial length, a lubricant opening, an axially confined lubricant well, a lubricant ramp, and a lubricant channel that spans the axial length of the inner journal. As shown in various examples, a lubricant opening may open to an axially confined lubricant well (e.g., a lubricant opening may be disposed within a lubricant well).

Various examples show a lubricant ramp, which may be defined by an arc span (e.g., an azimuthal angle in a cylindrical coordinate system). As described herein, an arc span of a lubricant ramp may be defined by an axial point offset from a central axis of an inner journal.

While various examples show three lobes (e.g., three sets of openings and association features), an exemplary bearing may include a single set of features or, alternatively, two or more sets of features (e.g., two or more of lubricant openings, two or more of axially confined lubricant wells, two or more of lubricant ramps and two or more of lubricant channels). In various examples, an inner journal includes a pad disposed between a lubricant ramp and a lubricant channel.

An exemplary bearing can receive a turbocharger shaft configured for rotation in a direction from a lubricant opening to at least a portion of a lubricant ramp and to a lubricant channel. As described herein, such an arrangement of features operates in conjunction with a direction of rotation of a shaft to enhance lubricant flow.

As described herein, an exemplary method of operating a turbocharger includes providing lubricant to an lubricant opening in a bearing disposed in a through bore of a center housing of the turbocharger; rotating a turbocharger shaft, supported by the bearing, in a clockwise direction; flowing the lubricant from the lubricant opening to an axially confined lubricant well; flowing the lubricant in a clockwise direction from the axially confined lubricant well to a lubricant ramp to a pad and to a lubricant channel that extends axially to an end of the bearing; and flowing the lubricant out of the end of bearing. Such a method can act to avoid lubricant coking by flowing lubricant at a rate sufficient to prevent temperatures or temperature-time profiles associated with coke formation. Such a method may further include halting rotation of a shaft and flowing lubricant from a lubricant opening to a lubricant channel (e.g., to transfer heat energy away from the bearing and shaft).

Figure 10:
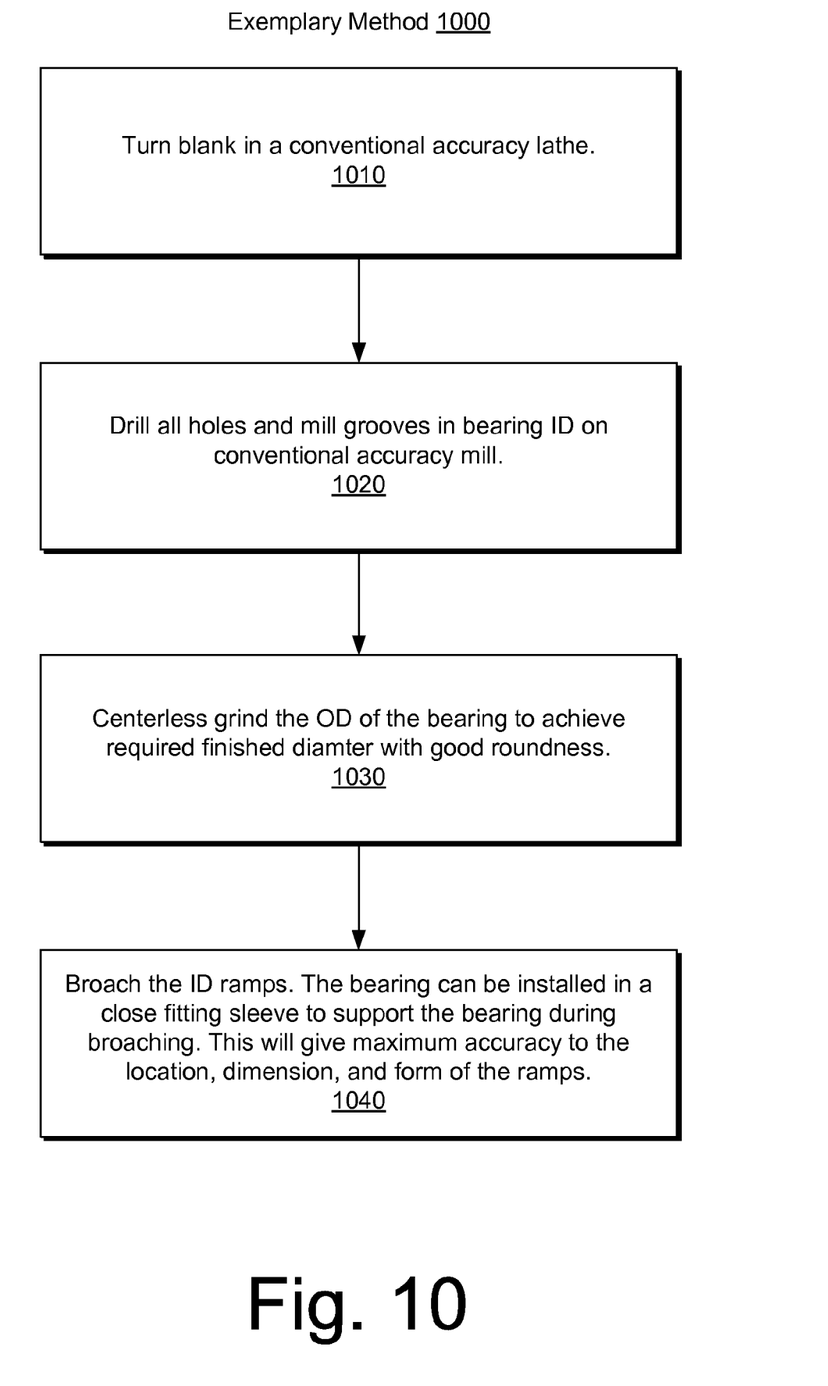
FIG. 10 is a diagram of an exemplary method to make various bearing features.

FIG. 10 shows a block diagram of an exemplary method 1000. In a turning block 1010, a bearing blank is turned, for example, using a conventional accuracy lathe. In a drilling and milling block 1020, holes are drilled and grooves are milled, for example, using a conventional accuracy mill. In a grinding block 1030, a centerless grind occurs for the outer diameter of the bearing to achieve required finished diameter with good roundness. In a broaching block 1040, inner diameter ramps are formed via broaching. In such an example, a bearing can be installed in a close fitting sleeve to support the bearing during broaching, which can provide for suitable accuracy for locations, dimensions, and formation of the ramps.

As described herein, an exemplary method includes providing a partially finished turbocharger bearing that includes at least one lubricant opening at a through bore, the through bore having a central axis; inserting a broach in the through bore; and manipulating the broach to form a lubricant ramp over an arc span. Such a method may include removing the broach from the through bore; inserting another broach in the through bore; and manipulating the other broach to form a pad, a lubricant channel or other feature. While the preceding example forms the ramp prior to a pad or lubricant channel (or other feature), an order may differ, as appropriate. In various examples, a lubricant ramp is formed as being disposed between a lubricant channel and a pad and where the lubricant ramp spans at least one lubricant opening. As mentioned, an inserting process may insert a broach at an offset from the central axis of the through bore (e.g., to form a lubricant ramp).

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A turbocharger assembly comprising:
a housing that comprises a through bore having a central axis extending between a compressor end and a turbine end of the housing; and
a bearing, configured for receipt by the through bore, wherein the bearing comprises an inner journal configured to rotatably support a turbocharger shaft with an intended direction of rotation and wherein the inner journal comprises
a central axis,
an axial length,
a lubricant opening,
an axially confined lubricant well wherein the lubricant opening opens to the lubricant well,
a lubricant ramp that comprises an arc span, in the intended direction of rotation of the turbocharger shaft, from a first radial distance measured from the central axis to a second, lesser radial distance measured from the central axis, the axially confined lubricant well and the lubricant opening being disposed within the arc span of the lubricant ramp,
a lubricant channel that spans the axial length of the inner journal, and
a lubricant flow path defined by a radial depth, an axial width and an arc span, in a direction opposite to the intended direction of rotation of the turbocharger shaft, from the axially confined lubricant well to the lubricant channel.

2. The turbocharger assembly of claim 1 wherein the lubricant opening is disposed within the lubricant well.

3. The turbocharger assembly of claim 1 where the arc span of the lubricant ramp is defined by an axial point offset from the central axis of the inner journal.

4. The turbocharger assembly of claim 1 wherein the inner journal comprises two or more of the lubricant openings, two or more of the axially confined lubricant wells, two or more of the lubricant ramps, two or more of the lubricant channels, and two or more of the lubricant flow paths.

5. The turbocharger assembly of claim 1 wherein the bearing comprises two of the inner journals.

6. The turbocharger assembly of claim 1 comprising another lubricant channel wherein the inner journal further comprises a pad disposed between the lubricant ramp and the other lubricant channel.

7. The turbocharger assembly of claim 1 further comprising a turbocharger shaft configured for rotation in a direction from the lubricant opening to at least a portion of the lubricant ramp and to the lubricant channel.

8. The turbocharger assembly of claim 1 comprising two of the inner journals, the two inner journals comprising a compressor end inner journal and a turbine end inner journal and further comprising a center section disposed between the two inner journals.

9. A method of operating a turbocharger, the method comprising:
providing lubricant to a lubricant opening in a bearing disposed in a through bore of a center housing of the turbocharger;
rotating a turbocharger shaft, supported by the bearing, in a clockwise direction;
flowing the lubricant from the lubricant opening to an axially confined lubricant well disposed within an arc span of a lubricant ramp;
flowing the lubricant in a clockwise direction from the axially confined lubricant well along the lubricant ramp to a pad at an end of the lubricant ramp and to a lubricant channel that extends axially to an end of the bearing;
flowing the lubricant out of the end of bearing;
halting the rotating of the turbocharger shaft; and
flowing lubricant from the lubricant opening to the lubricant channel in a counter-clockwise direction in a lubricant flow path defined by a radial depth, an axial width and an arc span.

10. The method of claim 9 wherein the method comprises avoiding lubricant coking by flowing the lubricant at a rate sufficient to prevent temperatures or temperature-time profiles associated with coke formation.

11. The turbocharger assembly of claim 1 wherein the arc span of the lubricant ramp extends from the lubricant channel to a pad.

12. The turbocharger assembly of claim 11 wherein the lubricant ramp comprises the first radial distance at the lubricant channel and the second radial distance proximate to the pad.

13. The method of claim 9 wherein the lubricant ramp comprises another end that coincides with the lubricant channel.

14. The method of claim 9 wherein the lubricant ramp comprises a first radial distance measured from a central axis of the bearing at the lubricant channel and a second, lesser radial distance measured from the central axis of the bearing proximate to the pad.

* * * * *